United States Patent Office 3,647,781
Patented Mar. 7, 1972

3,647,781
IMINES OF NITROHETEROCYCLIC ALDEHYDES AND COMPOUNDS OF THE PENICILLANIC ACID OR CEPHAM SERIES
Frederick Y. Wieslogle, North Brunswick, and Jack Bernstein, New Brunswick, N.J., assignors to E. R. Squibb & Sons, Inc., New York, N.Y.
No Drawing. Filed Aug. 14, 1969, Ser. No. 850,256
Int. Cl. C07d 99/24, 99/16
U.S. Cl. 260—239.1       7 Claims

ABSTRACT OF THE DISCLOSURE

Imines of nitroheterocyclic aldehydes and compounds of the penicillanic acid or cepham (including cephem) series containing an α-amino-carbocyclic-alkanoylamido group in the 6 or 7 position, respectively, are prepared. These compounds are useful as antibacterial, antitrichomonal and antifungal agents.

---

This invention relates to imines (Schiff bases) of nitroheterocyclic aldehydes and compounds of the penicillanic acid or cepham (including cepham, and optimally 2-cephem or 3-cephem) series containing an α-amino-carbocyclic-alkanoylamido group in the 6 or 7-position, respectively. Although any compound meeting the above limitations is included within the scope of this invention, the preferred compounds are those of Formula I:

$$R(CH_2)_n\underset{\underset{\overset{\|}{C}HR'}{N}}{CH}-CO-NH-\underset{O=\overset{|}{C}-\overset{|}{N}-Z}{CH-CH-S} \quad I$$

wherein R represents a carbocyclic radical, preferably phenyl, cyclohexyl, cyclohexenyl, cyclohexadienyl, and mono- and di-substituted derivatives of any of these; R' represents a nitroheterocyclic radical, preferably one of the formula

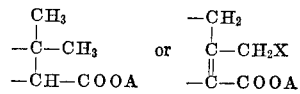

wherein Y is oxy (—O—), thio (—S—), imino (—NH—), or methylamino (—NCH₃—); one B is —CH= or —N=, and the other B is —CH=, and optimally 5-nitro-2-furyl, 1-methyl-5-nitro-2-imidazolyl or 5-nitro-2-thiazolyl; n is 0, 1, 2, 3 or 4; and Z is

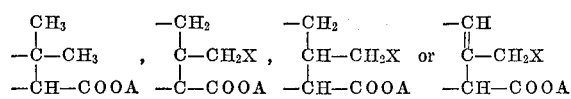

wherein A is hydrogen, lower alkyl (e.g., methyl), benzyl, a pharmaceutically acceptable cation, such as alkali metal (e.g., sodium and potassium), an alkaline earth metal (e.g., calcium and magnesium), ammonium, or an amine, such as a lower alkyl amine (e.g., methylamine), a di-lower alkyl amine (e.g., diethylamine), a phenyl-lower alkyl amine (e.g., benzylamine), a di(phenyl-lower alkyl)-amine (e.g., dibenzylamine), and alkylenediamine (e.g., N,N'-dibenzylethylenediamine) or the like; and X represents hydrogen, lower alkanoyloxy (e.g., acetoxy, propanoyloxy and the like), a phenyl-lower alkanoyloxy (e.g., phenylacetoxy), benzoyl, an amino radical (e.g., lower alkylamino, such as methylamino, di-lower alkylamino, such as dimethylamino and diethylamino, piperidino, morpholino, pyrrolidino, and N-methylpiperazino), a quaternary ammonium radical (e.g., pyridinium), or together X and A represent a bond linking carbon and oxygen in a lactone ring.

Among the substitutions on the carbocyclic radical (R) may be mentioned lower alkyl and lower alkoxy, including both straight and branched chain radicals, such as methyl, ethyl, n-propyl, isopropyl, n-butyl, isobutyl, tert-butyl, n-amyl, methoxy, ethoxy, n-propoxyl, isopropoxy and the like.

The particularly preferred compounds are those wherein R is unsubstituted phenyl or 1,4-cyclohexadienyl, R' is 5-nitro-2-furyl, n is zero or one, and Z is either

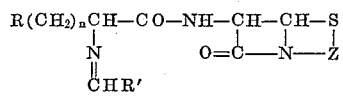

wherein A is as above-defined, and X is hydrogen or lower alkanoyloxy (optimally acetoxy).

It will be appreciated that certain of the compounds of this invention exist in different optically active forms. The various stereoisomeric forms as well as the racemic mixtures are within the scope of this invention.

The imines of this invention can be prepared by reacting the nitro heterocyclic aldehyde with a compound of the penicillanic acid or cepham (including cephem) series containing an α-amino-carbocyclic-alkanoylamido group in the 6 or 7-position, respectively. The reaction is preferably carried out in an inert solvent such as methylene chloride or dimethylformamide, generally at room temperature.

The preferred second reactants in this process are of the Formula II:

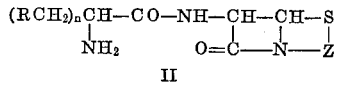

wherein R, n, and Z are as hereinbefore defined. Among the suitable compounds of the Formula II may be mentioned 6 - [α-R(CH₂)ₙ-α-aminoacetylamido]penicillanic acids, such as α-aminobenzylpenicillin,
α-amino-α-phenethylpenicillin,
α-amino-β-phenylethylpenicillin,
α-amino-α-phenylpropylpenicillin,
α-amino-β-phenylpropylpenicillin,
α-amino-δ-phenylbutylpenicillin,
α-amino-β-phenylamylpenicillin,
α-amino-ε-phenylamylpenicillin,
α-aminocyclohexylmethylpenicillin,
α-amino-β-cyclohexylethylpenicillin,
α-amino-(1-cyclohexenyl)methylpenicillin,
α-amino-β-(1-cyclohexenyl)ethylpenicillin,
α-amino(1,4-cyclohexadienyl)methylpenicillin, and α-amino-β-(1,4-cyclohexadienyl)ethylpenicillin; the 7-[α-R(CH₂)ₙ - α - aminoacetylamido]cephalosporanic acids, such as those wherein R and n have the same values as are present in the specific penicillins listed above, the corresponding desacetoxycephalosporanic acid derivatives, the corresponding cephalosporanic acid lactones, the saturated derivatives of both of these (i.e., the cephams) and the corresponding compounds wherein the double bond is in the 2, rather than the 3, position.

In those instances where the compounds of Formula II are new substances, they can be prepared by reacting a compound of the Formula III:

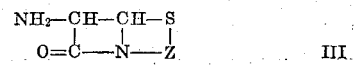

wherein Z is as hereinbefore defined, with an activated form of a compound of the Formula IV:

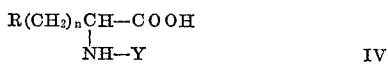

wherein R and n are as hereinbefore defined, and Y' is a protective group, such as triphenylmethyl, tert-butoxycarbonyl, 2,2,2 - trichlorethoxycarbonyl, 4 - oxo-2-pentenyl-2, 1-carbomethoxy - 1 - propenyl-2 or the like. The protective form is prepared by coupling the free amino compound with a compound such as triphenylmethyl chloride, tert-butyl azidoformate, 2,2,2 - trichloroethyl chloroformate, acetylacetone, methylacetoacetate or the like. After the reaction has been completed, the protecting group is removed, e.g., by treatment with aqueous acetic acid, trifluoroacetic acid, zinc-acetic acid, or aqueous mineral acid, respectively, to give the compound with the free amino group. Alternatively, the amino group may be protected by protonation as the salt form before and during the subsequent reaction.

The products of this invention, wherein A is hydrogen, form salts which are also part of the invention. These salts are prepared in the usual manner by reaction with the desired base. It is frequently convenient to isolate and purify the product by forming a soluble or insoluble salt, as desired, and then regenerating the free compound, by neutralization for example.

The compounds of this invention have a broad spectrum of antibiotic activity. They have antibacterial activity against both gram positive and gram negative organisms, such as *Staphylococcus aureus, Salmonella schottmuelleri, Pseudomonas aeruginosa, Proteus vulgaris, Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to penicillin G and other penicillins and cephalosporins. For example, a compound of Formula I may be used in various animal species in an amount of about 0.1 to 100 mg./kg. daily, orally or parenterally, in single or two to four divided doses to treat infections of bacterial origin. Up to about 600 mg. of a compound of Formula I may be incorporated in an oral dosage form such as tablets, capsules or elixirs or in an injectable form in a sterile aqueous vehicle prepared according to conventional pharmaceutical practice. In cleaning or disinfecting compositions, e.g., in barns or dairy equipment, a concentration of about 0.01 to 1% by weight of such compounds admixed with, suspended or dissolved in conventional inert dry or aqueous carriers for application by washing or spraying may be used.

In addition, the compounds of this invention also have antitrichomonal activity as well as antifungal activity and may be used in non-aqueous formulations containing 0.5 to 3% of the penicillin or cephalosporin for the topical treatment of vaginitis caused by *Trichomonas vaginalis, Candida albicans* or *Hemoplilus vaginalis*.

The following examples illustrate the invention (all temperatures being in centigrade):

EXAMPLE 1

5-nitrofuran-2-carboxaldehyde derivative of α-aminobenzylpenicillin

A slurry of 36 grams of α-aminobenzylpenicillin (ampicillin) in 600 ml. of methylene chloride and 25 ml. of triethylamine is stirred vigorously at room temperature to form the triethylamine salt of α-aminobenzylpenicillin. To this slurry there is added 14 grams of 5-nitrofuran-2-carboxaldehyde and the mixture stirred for 24 hours at room temperature. The reaction mixture is concentrated under reduced pressure to yield a water soluble residue. This is dissolved in cold water and the pH adjusted to 2.5. The precipitate is collected and redissolved in water by adjusting the pH of the aqueous suspension to 6.5 by the addition of sodium bicarbonate. The solution is extracted with ether and the pH of the aqueous solution adjusted to 2.5 by the addition of dilute hydrochloric acid. The precipitated solid is filtered, washed with water and air-dried to yield the desired product, the 5-nitrofuran-2-carboxaldehyde derivative of α-aminobenzylpenicillin.

EXAMPLE 2

5-nitrofuran-2-carboxaldehyde derivative of 7-(α-aminophenylacetamido)desacetoxy cephalosporanic acid Following the procedure of Example 1, but replacing the α-aminobenzylpenicillin by an equivalent amount of 7 - (α - aminophenylacetamido)desacetoxycephalosporanic acid there is obtained the desired 5-nitrofuran-2-carboxaldehyde derivative of 7-(α-aminophenylacetamido)-desacetoxycephalosporanic acid.

EXAMPLE 3

2-nitrothiazole-5-carboxaldehyde derivative of α-aminobenzylpenicillin

Following the procedure of Example 1, but replacing the 5-nitrofuran-2-carboxaldehyde by an equivalent amount of 2-nitrothiazole-5-carboxaldehyde, there is obtained the desired 2-nitrothiazole-5-carboxaldehyde derivative of α-aminobenzylpenicillin.

EXAMPLE 4

5-nitrothiazole-2-carboxaldehyde derivative of α-aminobenzylpenicillin

Following the procedure of Example 1, but replacing the 5-nitrofuran-2-carboxaldehyde by an equivalent amount of 5-nitrothiazole-2-carboxaldehyde, there is obtained the desired 5-nitrothiazole-2-carboxaldehyde derivative of α-aminobenzylpenicillin.

EXAMPLE 5

1-methyl-5-nitro-imidazole-2-carboxaldehyde derivative of α-aminobenzylpenicillin Following the procedure of Example 1, but replacing the 5-nitrofuran-2-carboxaldehyde by an equivalent amount of 1 - methyl-5-nitroimidazole-2-carboxaldehyde, there is obtained the desired 1-methyl-5-nitroimidazole-2-carboxaldehyde derivative of α-aminobenzylpenicillin.

EXAMPLE 6

5-nitropyrrole-2-carboxaldehyde derivative of α-aminobenzylpenicillin

Following the procedure of Example 1, but replacing the 5-nitrofuran-2-carboxaldehyde by an equivalent amount of 5-nitropyrrole-2-carboxaldehyde, there is obtained the desired 5-nitropyrrole-2-carboxaldehyde derivative of α-aminobenzylpenicillin.

EXAMPLE 7

5-nitrofuran-2-carboxaldehyde derivative of 7-(α-aminophenylacetamido)cephalosporanic acid Following the procedure of Example 1, but replacing the α-aminobenzylpenicillin by an equivalent amount of 7-(α-aminophenylacetamido)cephalosporanic acid, there is obtained the desired 5-nitrofuran-2-carboxaldehyde derivative of 7-(α-aminophenylacetamido)cephalosporanic acid.

EXAMPLE 8

5-nitrofuran-2-carboxaldehyde derivative of α-amino-(1,4-cyclohexadienyl)methylpenicillin Following the procedure of Example 1, but replacing the α-aminobenzylpenicillin by an equivalent amount of α - amino(1,4-cyclohexadienyl)methylpenicillin prepared as disclosed in U.S. patent application, Ser. No. 741,852, filed July 2, 1968, there is obtained the desired 5-nitrofuran-2-carboxaldehyde derivative of α-amino(1,4-cyclohexadienyl)methylenicillin.

EXAMPLE 9

5-nitrofuran-2-carboxaldehyde derivative of α-aminocyclohexylmethylpenicillin

Following the procedure of Example 1, but replacing the α-aminobenzylpenicillin by an equivalent amount of α-aminocyclohexylmethylpenicillin, there is obtained the desired 5-nitrofuran-2-carboxaldehyde derivative of α-aminocyclohexylmethylpenicillin.

EXAMPLE 10

5-nitrofuran-2-carboxaldehyde derivative of 7-[(2-amino-2-phenyl)-acetamido] - 3 - hydroxymethyl-3-cephem-4-carboxylic acid Following the procedure of Example 1, but replacing the α-aminobenzylpenicillin by an equivalent amount of 7-[(2-amino-2-phenyl)acetamido] - 3 - hydroxymethyl-3-cephem-4-carboxylic acid, there is obtained the desired 5-nitrofuran-2-carboxaldehyde derivtaive of 7-[(2-amino-2-phenyl)acetamido]-3-hydroxymethyl - 3 - cephem - 4 - carboxylic acid.

Alternatively, this product is obtained by treating the 5-nitrofuran-2-carboxaldehyde derivative of 7-(α-aminophenylacetamido)cephalosporanic acid in aqueous dimethylsulfoxide with a solution of citrus acetyl esterase and isolating the desired product by chromatography through a cellulose column.

EXAMPLE 11

5 - nitrofuran - 2 - carboxaldehyde derivative of 7-[(2-amino - 2 - phenyl)acetamido] - 3 - hydroxymethyl-3-cephem-4-carboxylic acid lactone Following the procedure of Example 1, but replacing the α - aminobenzylpenicillin by an equivalent mount of 7 - [(2 - amino - 2 - phenyl)acetamido] - 3 - hydroxymethyl - 3 - cephem - 4 - carboxylic acid lactone hydrochloride, there is obtained the desired 5 - nitrofuran-2-carboxaldehyde derivative of 7-[(2 - amino - 2 - phenyl)acetamido] - 3 - hydroxymethyl - 3 - cephem - 4 - carboxylic acid lactone.

Alternatively, this product is obtained by adjusting the pH to 1.5 of an aqueous dimethylsulfoxide suspension of the 5 - nitrofuran - 2 - carboxaldehyde derivative of 7 - [(2 - amino - 2 - phenyl)acetamido] - 3 - hydroxymethyl - 3 - cephem - 4 - carboxylic acid and allowing the mixture to stir for 24 hours. Concentration of the reaction mixture under reduced pressure gives the desired product.

Salts of the compounds of Examples 1 through 11 which contain a free carboxylic acid group are prepared in the usual manner by treating with the desired base. Suitable bases include the alkali metal hydroxides (e.g., sodium hydroxide and potassium hydroxide), the alkaline earth metal hydroxides (e.g., calcium hydroxide), ammonium hydroxide, and amines, such as primary amines (e.g., methylamine), secondary amines (e.g., diethylamine), tertiary amines (e.g., trimethylamine), and alkylenediamines (e.g., N,N' - dibenzylethylenediamine).

What is claimed is:

1. Imines of nitroheterocyclic aldehydes and compounds of the pencillanic acid or cepham series containing an α-amino-carbocyclic-alkanoylamido group in the 6 or 7 position, respectively and having the formula $$\begin{array}{c} R(CH_2)_n\text{CH-CO-NH-CH-CH-S} \\ | \hspace{3.5cm} | \hspace{0.5cm} | \\ N \hspace{2cm} O=C-N-Z \\ \| \\ CHR' \end{array}$$

wherein R is a carbocyclic radical selected from the group consisting of phenyl, cyclohexyl, cyclohexenyl, cyclohexadienyl, or a mono- or di-substituted derivative of any of these, wherein the substituent is selected from the group consisting of lower alkyl or lower alkoxy, R' is a nitroheterocyclic radical of the formula $$O_2N \underset{Y}{\overset{B\text{---}B}{\diagdown\diagup}} CHO$$

wherein Y is oxy, thio, imino or methylimino, one B is CH or N, and the other B is CH, n is zero through 4, and Z is one of the radicals $$\begin{array}{ccc} -CH_2 & -CH_2 & -CH \\ | & | & \| \\ C-CH_2X & CH-CH_2X & \text{and} & C-CH_2X \\ \| & | & | \\ -C-COOA & -CH-COOA & -CH-COOA \end{array}$$

wherein A is hydrogen, lower alkyl, benzyl, or a pharmaceutically acceptable cation, X is hydrogen, lower alkanoyloxy, phenyl-lower alkanoyloxy, benzoyl, an amino radical, a quaternary ammonium radical, or together X and A represent a bond linking carbon and oxygen in a lactone ring.

2. Thecompound of claim 1, wherein R' is 5-nitro-2-furyl, 1 - methyl - 5 - nitro - 2 - imidazolyl or 5-nitro-2-thiazolyl.

3. The compound of claim 1, wherein R is phenyl, R' is 5-nitro-2-furyl, n is zero, and Z is $$\begin{array}{c} CH_3 \\ | \\ -C-CH_3 \\ | \\ -CH-COOA \end{array}$$

4. The compound of claim 3, wherein A is hydrogen.

5. The compound of claim 1, wherein R is 1,4-cyclohexadienyl, R' is 5-nitro-2-furyl, n is zero, and Z is $$\begin{array}{c} CH_3 \\ | \\ -C-CH_3 \\ | \\ -CH-COOA \end{array}$$

6. The compound of claim 5, wherein A is hydrogen.

7. The compound of claim 1, wherein R is phenyl, R' is 5-nitro-2-furyl, n is zero and Z is $$\begin{array}{c} -CH_2 \\ | \\ C-CH_3 \\ \| \\ -C-COOH \end{array}$$

References Cited

UNITED STATES PATENTS

| | | | |
|---|---|---|---|
| 3,308,023 | 3/1967 | Russell | 167—65 |
| 3,351,587 | 11/1966 | Alburn et al. | 260—239.1 |
| 3,479,339 | 11/1969 | Holdrege | 260—239.1 |

NICHOLAS S. RIZZO, Primary Examiner

U.S. Cl. X.R.

260—243 C; 424—271

PO-1050
(5/69)

UNITED STATES PATENT OFFICE
CERTIFICATE OF CORRECTION

Patent No. 3,647,781                          Dated March 7, 1972

Inventor(s) Frederick Y. Wiselogle and Jack Bernstein

It is certified that error appears in the above-identified patent and that said Letters Patent are hereby corrected as shown below:

Column 1, line 45, "methylamino" should read --methylimino--.
Column 2, Formula II, "$(RCH_2)_n$" should read --$R(CH_2)_n$--.

Column 3, Formula IV, "Y" should read --Y'--. Column 4, line 14, "acid there" should read --acid, there--. Column 4, line 75, "methylenicillin" should read --methylpenicillin--. Column 5, line 34, "mount" should read --amount--. Column 5, Column 6, claim 1, second formula should read

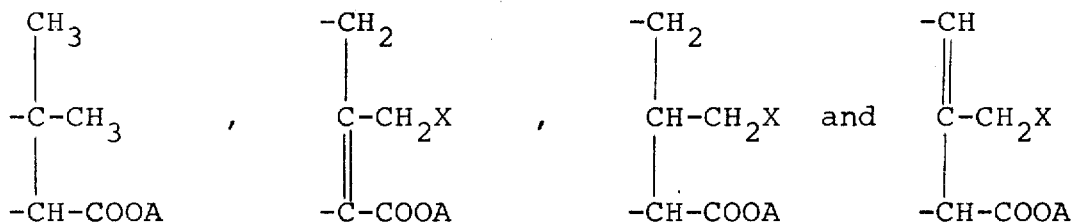

Column 6, line 39, "compound" should read --compounds--.
Column 1, line 5, "Wieslogle" should read --Wiselogle--.

Signed and sealed this 26th day of December 1972.

(SEAL)
Attest:

EDWARD M. FLETCHER, JR.
Attesting Officer

ROBERT GOTTSCHALK
Commissioner of Patents